United States Patent [19]

Grein

[11] Patent Number: 4,783,962
[45] Date of Patent: Nov. 15, 1988

[54] BRAKE BOOSTER VAPOR TRAP FILTER AND FUEL TANK VAPOR TRAP CANISTER VAPOR GUARD SYSTEM

[75] Inventor: John R. Grein, Waterport, N.Y.

[73] Assignee: General Motors Coporation, Detroit, Mich.

[21] Appl. No.: 878,349

[22] Filed: Jun. 25, 1986

Related U.S. Application Data

[63] Continuation-in-part of Ser. No. 692,551, Jan. 18, 1985, abandoned.

[51] Int. Cl.⁴ .................. F15B 21/04; F02M 33/02
[52] U.S. Cl. ........................... 60/397; 60/453; 123/520; 55/58; 55/163
[58] Field of Search ............ 60/397, 411, 453; 123/519–520; 55/58, 163

[56] References Cited

U.S. PATENT DOCUMENTS

| | | | |
|---|---|---|---|
| 3,515,107 | 6/1970 | Joyce | 123/520 |
| 3,542,239 | 11/1970 | Latvala et al. | 123/519 X |
| 4,109,464 | 8/1978 | Wickland | 60/397 |
| 4,137,882 | 2/1979 | Thornburgh | 123/520 |
| 4,149,504 | 4/1979 | Walters | 123/520 |
| 4,193,383 | 3/1980 | Rogers | 123/520 |
| 4,326,489 | 4/1982 | Heitert | 123/520 |
| 4,541,396 | 9/1985 | Sato et al. | 123/520 X |

FOREIGN PATENT DOCUMENTS

| | | | |
|---|---|---|---|
| 53-27721 | 3/1978 | Japan | 123/520 |
| 56-113039 | 9/1981 | Japan | 123/520 |
| 59-41650 | 3/1984 | Japan | 123/520 |

*Primary Examiner*—Robert E. Garrett
*Assistant Examiner*—George Kapsalas
*Attorney, Agent, or Firm*—D. D. McGraw

[57] ABSTRACT

Vapor guard systems which prevent vapors from reaching a servomotor from a power source for the servomotor. One embodiment uses a control valve which directs such vapors to a vapor trap filter under conditions where vapor flow may be toward the servomotor, and operates to permit purging of the vapor trap filter when there is flow only away from the servomotor. Another embodiment uses an in-line vapor trap filter and a vapor trap canister, normally used to trap fuel vapors from a vehicle fuel tank, to trap fuel vapors from the power source. Both the in-line vapor trap filter and the canister are purged of adsorber vapors where the power source is operating.

5 Claims, 2 Drawing Sheets

BRAKE BOOSTER VAPOR TRAP FILTER AND FUEL TANK VAPOR TRAP CANISTER VAPOR GUARD SYSTEM

This is a continuation-in-part of application Ser. No. 692,551, filed on Jan. 18, 1985 and now abandoned.

BACKGROUND OF THE INVENTION

The invention relates to a vapor guard system for a servomotor, and more particularly to a system which prevents vapors from reaching the servomotor at any time, such vapors being present at a pressure source for the servomotor. In the disclosed embodiments of the invention the servomotor is a vacuum suspended power brake booster powered by vacuum from the intake of the automobile engine and air at atmospheric pressure. The invention can also be used with other types of servomotors having different functions but having one or more parts which may be adversely affected by vapors from a pressure source. It could, for example, be used in a servomotor in a positive pressure system in which vapors are found which possibly cause damage to the servomotor.

The invention is an improvement over the vapor guard system disclosed and claimed in U.S. Pat. No. 4,109,464, issued Aug. 29, 1978 and assigned to the common assignee.

The type of vacuum suspended power brake booster systems in use for many years in vehicles has included a brake booster having a diaphragm as part of the power wall and dividing the booster housing into a vacuum chamber and a variable pressure chamber. When the booster is inactive, both chambers are vacuum charged. Upon booster actuation the connection between the two chambers is closed and atmospheric air pressure is controllably introduced into the variable pressure chamber, setting up a pressure differential across the power wall and actuating the booster. A check valve is provided as a part of the booster and provides a connection between the vacuum conduit and the booster vacuum chamber. The other end of the vacuum conduit is tapped into a portion of the vehicle internal combustion engine where intake vacuum is present. This may be at the base of the carburetor or in a portion of the intake manifold downstream of the carburetor, for example. In certain installations it has been found that fuel vapor is present at the point where the vacuum conduit is tapped in and, under certain relatively rare conditions, can be pulled into the vacuum chamber of the booster and condensed. One such condition has been found to occur in extremely cold ambient temperatures which cause the check valve not to fully seal the vacuum conduit relative to the vacuum chamber when the absolute pressure in the vacuum chamber is lower than the absolute pressure in the engine intake acting as a vacuum source. This can occur upon full throttle opening or when the engine is not running. If a sufficient concentration of fuel vapor is located at the vacuum conduit tap-in point on the engine when this occurs, it will be entrained in the flow of air that moves from the engine through the conduit toward the vacuum chamber. A concentration of fuel vapor and condensed fuel in the vacuum chamber can adversely affect materials made of synthetic or natural rubbers. The power diaphragm is usually made of such a material. It is therefore desirable to prevent any fuel vapor from entering the brake booster through the vacuum conduit if the various circumstances occur together in an installation which would tend to introduce the fuel vapor into the booster.

The vapor guard system disclosed in U.S. Pat. No. 4,109,464 includes a filter in the vacuum conduit between the internal combustion engine source of vacuum and the brake booster check valve so that all fluid flowing in either direction between the brake booster and the engine vacuum source must pass through the filter. The filter is provided with a material which will trap or adsorb the fuel vapor that is entrained in any air flow from the internal combustion engine toward the brake booster. When the air flow returns to the normal flow pattern, which is the predominant condition where there is any flow at all, the fuel vapor so trapped or adsorbed will be released or desorbed and will be returned to the engine with the air flowing from the booster toward the engine. Thus at no time does the deleterious vapor come into the presence of any part of the brake booster which can be adversely affected by it, insofar as transmission of such vapor through the vacuum conduit connecting the booster to the internal combustion engine is concerned. The material used in the filter to adsorb the fuel vapors may be activated charcoal. Other suitable materials may also be utilized.

SUMMARY OF THE INVENTION

In the preferred embodiment of the invention illustrated, a vapor trap filter may be used in a manner similar to that of U.S. Pat. No. 4,109,464 discussed above. In addition, the manifold vacuum conduit has a branch which is connected through a purge control valve to the canister containing fuel vapor adsorbent material normally used to adsorb fuel vapors from the vehicle fuel tank while the vehicle is at rest. The conduit is also connected through a check valve to the canister so that the canister is purged while the engine is running. The vapor trap filter connected in the conduit between the servomotor check valve and the engine intake manifold is purged by desorbing the fuel vapors previously adsorbed therein when the power brake booster is operating so as to cause the flow of air from the servomotor through the vapor trap filter to the engine intake manifold.

DETAILED DESCRIPTION OF THE PREFERRED EMBODIMENT

Figure 1:
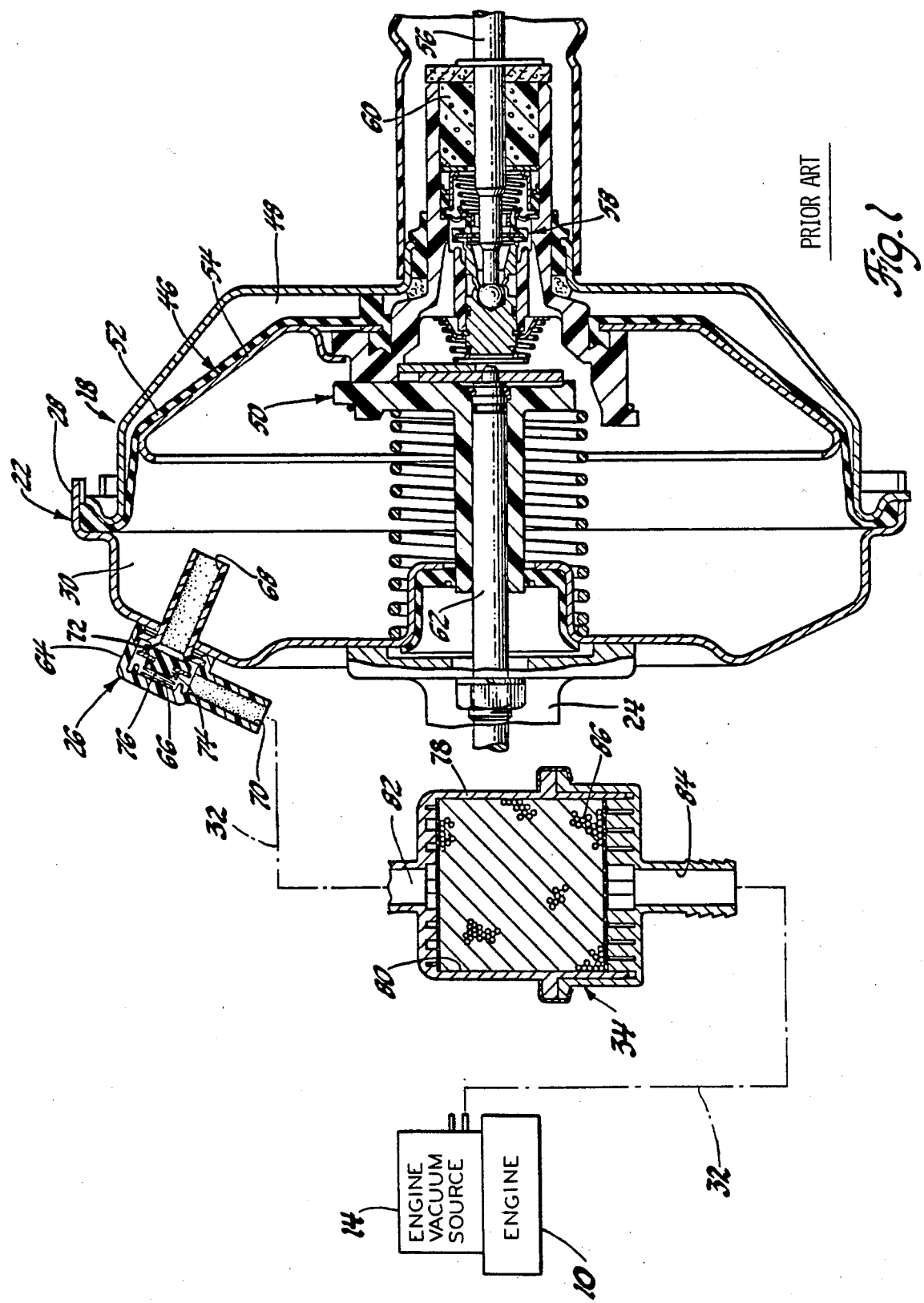
FIG. 1 is a cross-section view, with parts broken away, illustrating a vacuum suspended booster and check valve as well as a vapor trap filter, as arranged in the prior art U.S. Pat. No. 4,109,464, with portions of the system being schematically illustrated.

The system shown in FIG. 1 of the drawings includes a gasoline-fueled engine 10 of the type commonly used to power motor vehicles. The engine is illustrated as having an intake manifold 14 which acts as an engine vacuum source. As is well known in the art, the engine may be provided with a carburetor or other appropriate fuel and air mixing device so that a mixture of fuel and air is contained in the engine intake manifold under normal operating conditions. A vacuum suspended brake booster and master cylinder assembly 18 is suitably mounted in a vehicle for actuation by the vehicle operator in the usual manner to brake the vehicle. Assembly 18 includes the servomotor 22 and the master cylinder 24. The servomotor has a vacuum check valve assembly 26 mounted on the servomotor housing 28 and opening at one side into the servomotor vacuum chamber 30. The other side of the vacuum check valve assembly 26 is connected by vacuum conduit 32 to the source of vacuum 14 of the engine 10.

The brake booster servomotor 22 has a power wall 46 dividing housing 28 into vacuum chamber 30 and a variable pressure chamber 48. Power wall 46 includes a piston 50, a flexible diaphragm 52, and a diaphragm support member 54. The outer periphery of diaphragm 52 is sealingly secured to housing 28, while piston 50, diaphragm support member 54 and the inner periphery of diaphragm 52 are linearly movable. The servomotor 22 includes an input push rod 56 which is moved by the vehicle operator to control the brake system. Push rod 56 is connected to control valve assembly 58 to control the pressure changes in variable pressure chamber 48. An atmospheric air pressure inlet is provided through atmospheric air filter 60. The servomotor has an output push rod 62 which is moved by the power wall 46 upon servomotor actuation to actuate the master cylinder assembly 24 and pressurize the hydraulic brake circuitry of the vehicle. The pressure servomotor assembly 22 is typical of servomotors in common usage in this application. An example of the servomotor, with a more detailed description of its operation, is found in U.S. Pat. No. 3,249,021, issued May 3, 1966 and entitled "Power Brake Booster."

The vacuum check valve assembly 26 may be of any suitable type and is illustrated as being of the type shown in U.S. Pat. No. 3,086,544, issued Apr. 23, 1963 and entitled "Check Valve". Valve assembly 26 has a housing 64 defining a valve chamber 66. The valve assembly has a pair of ports respectively defined by housing passages 68 and 70. The end of passage 68 opening into chamber 66 defines a valve seat 72. Check valve 74 is contained within chamber 66 and is urged against seat 72 by spring 76. Passage 70 is always connected with chamber 66. Passage 68 opens into vacuum chamber 30 of servomotor 22, and passage 70 is connected to vacuum conduit 32. It can be seen that so long as the absolute pressure in passage 70 is less than the absolute pressure in vacuum chamber 30, to at least a slight extent, valve 74 is held open against the closing force of spring 76. This is the condition normally occurring when vacuum chamber 30 is being evacuated to a lower absolute pressure by vacuum from the vacuum source 14. If the absolute pressure in passage 70 equals or exceeds the absolute pressure in vacuum chamber 30, spring 76 will close check valve 74 against seat 72, holding the lower absolute pressure in vacuum chamber 30. This normally occurs when the internal combustion engine 10 is not running and also can occur when the throttle valve in a carburetor equipped vehicle is fully opened so as to momentarily increase the absolute pressure in intake 14 to a higher level than the absolute pressure in vacuum chamber 30.

Vapor trap 34 includes a housing 78 having a chamber 80 formed therein. One side of chamber 80 is connected with a port 82 and the other side is connected with a port 84, ports 82 and 84 being provided on opposite sides of the vapor trap assembly 34. Port 82 is connected to one part of vacuum conduit 32. Port 84 is connected to the other part of conduit 32 which is connected to vacuum source 14. Chamber 80 contains a suitable material 86 which can trap or adsorb fuel vapor and can release or desorb the vapor. A preferred material is activated charcoal and is provided in sufficient quantity to be able to contain the amount of fuel vapor trapped therein between purging actions without allowing the fuel vapor to reach booster chamber 30.

In the servomotor condition illustrated, the brake servomotor is in the released position and control valve assembly 58 provides a fluid connection between vacuum chamber 30 and variable pressure chamber 48 so that both chambers have vacuum therein. Thus the servomotor is vacuum suspended. When the servomotor is to be actuated, the vehicle operator causes push rod 56 to be moved leftwardly as seen in FIG. 1 to disconnect the connection between chambers 30 and 48 of the servomotor and then to controllably admit atmospheric air pressure into chamber 48 through filter 60. This establishes a differential pressure acting across power wall 46 and generates a brake booster force transmitted from the power wall through output push rod 62 to actuate master cylinder 24. In order to release the brakes, the operator permits push rod 56 to be moved to the right, control valve assembly 58 therefore closing the atmospheric air connection to chamber 48 and then reopening the vacuum connection of chamber 48 to vacuum chamber 30. Since this causes an absolute pressure increase in the booster, and particularly in vacuum chamber 30, air from the booster is evacuated through check valve assembly 26 and vacuum conduit 32 to the vacuum source 14. The servomotor is therefore fully recharged with vacuum. In this process there is air flow from the servomotor 22 through conduit 32 to the vacuum source 14. This is normal brake booster operation as is commonly practiced in the art.

As disclosed in U.S. Pat. No. 4,109,464, it has been found that upon some conditions of operation, fuel vapor present at intake 14, either while the engine is running or while it is stopped, can be entrained in a flow of air in conduit 32 going toward the booster servomotor 22. One such condition can occur if the check valve 74 does not fully seat on seat 72 while at the same time the absolute pressure in conduit 32 is greater than the absolute pressure in chamber 30. If fuel vapor is so present, it may flow through conduit 32 into vacuum chamber 30 if vapor trap assembly 34 is not present. It may remain in the chamber 30 in a vapor state or under some circumstances may be condensed in the chamber. It has been found that sufficient concentration of condensed fuel vapor inside servomotor 22 can have an adverse effect on certain parts of the servomotor, and particularly the diaphragm 52. For this reason it was considered to be desirable to guard the servomotor against the presence of vapor inside housing 28. Therefore vapor trap assembly 34 was connected in vacuum conduit 32. Thus when under the conditions wherein fuel vapor is entrained in an air flow from vacuum source 14 toward the booster servomotor 22, the vapor will be trapped or adsorbed by the activated charcoal 86 in chamber 80 instead of entering the servomotor 22. The servomotor is therefore guarded against the presence of such deleterious vapor. If this occurred while the engine was stopped, and the engine is thereafter started, air flow will take place from chambers 48 and 30 through vacuum check valve assembly 26 and conduit 32 to the vacuum source 14 to recharge the servomotor with vacuum. The air flow in conduit 32 pulls air through the activated charcoal 86, desorbing the fuel vapor adsorbed by the charcoal and purging the vapor trap 34. This action requires a short period of time, usually only one or two seconds.

Figure 2:
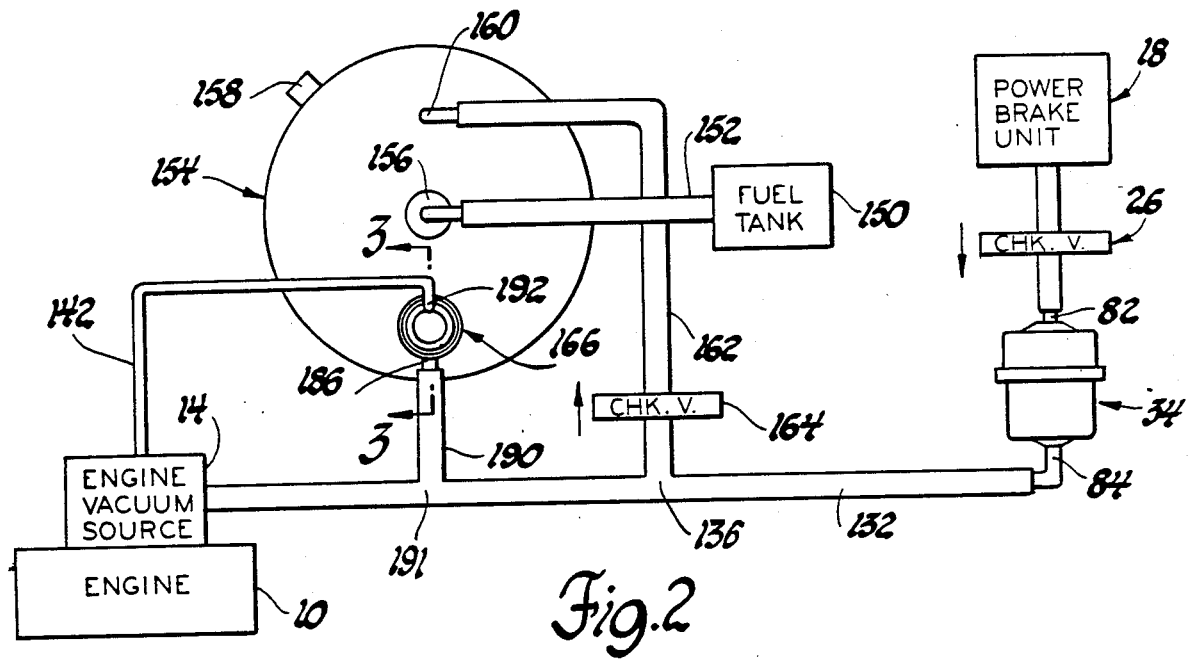
FIG. 2 is a schematic illustration of the preferred embodiment of the invention.

In the embodiment of the invention herein claimed, shown in FIG. 2, the same vacuum source 14, power brake unit 18, check valve 26 and vapor trap filter 34 as found in the system of FIG. 1 are used. The power brake unit 18 is connected through check valve 26 to the port 82 of vapor trap filter 34. Port 84 of the vapor trap filter 34 is connected to conduit 132 which is in turn connected to the vacuum source 14 so that vacuum is available to the power brake unit 18 when vacuum is being produced by the vacuum source. This arrangement is to this extent like that disclosed in FIG. 1 of the drawings and in the above noted U.S. Pat. No. 4,109,464.

In the system of FIG. 2, the vehicle in which the system is installed includes a fuel tank 150 connected by a conduit 152 to a fuel vapor adsorption canister 154 at canister port 156. The canister is provided with an atmospheric air vent 158. Canister port 160 is connected by branch vacuum conduit 162 to the main vacuum conduit 132 through a check valve 164 and a tee 136. Check valve 164 may be of the same general type as check valve 26, but is normally open. It is closed with any attempted flow from canister 154 toward vacuum conduit 132. Canister 154 is another fuel vapor trap.

Figure 3:
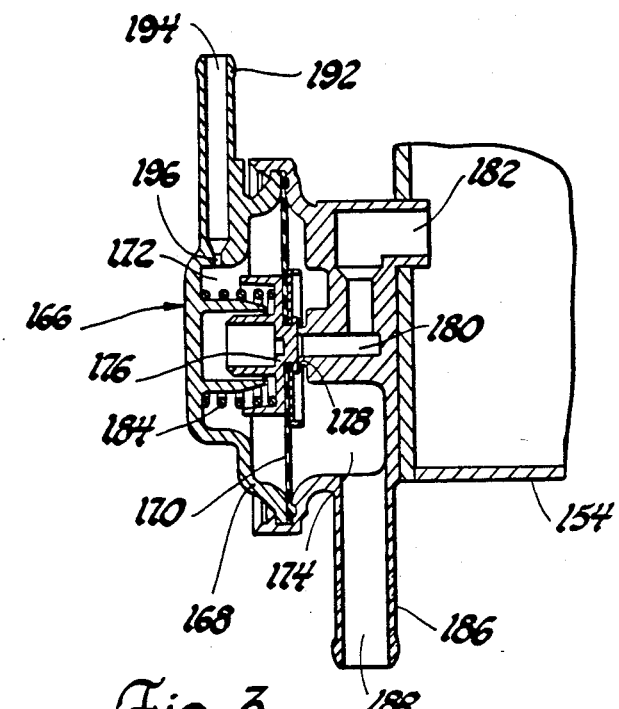
FIG. 3 is a fragmentary cross-section view of a purge control valve of the type used in the embodiment of FIG. 2, the view of the figure being taken in the direction of arrows 3—3, of FIG. 2.

A control valve 166 is mounted on the canister 154. As shown in FIG. 3, control valve housing 168 has a diaphragm 170 secured therein to divide the interior of housing 168 into chambers 172 and 174. A valve 176 is mounted on diaphragm 170 and cooperates with a valve seat 178 formed about one end of a housing passage 180. Passage 180 is connected to a port 182 which opens into the interior of canister 154. A valve spring 184 urges valve 176 toward closing engagement with the valve seat 178. Chamber 174 is connected by way of the housing vacuum tube 186 and port 188 to vacuum branch conduit 190, which is in turn connected to vacuum conduit 132 by a tee 191. Another housing vacuum tube 192 forms a port 194 which is connected to the purge control vacuum conduit 142. Conduit 142 is also connected to the vacuum source 14. Port 194 opens into chamber 172 through an orifice 196 formed in a part of housing 168.

When the vehicle engine 10 is stopped for some period of time, the system is in a static condition wherein any fuel vapors that may have passed from the intake manifold operating as a vacuum source to conduit 132 will normally have been adsorbed in the vapor trap filter 34. Since the control valve 166 has no substantial differential pressure acting across its diaphragm 170, valve spring 184 will keep valve 176 closed against valve seat 178. However, any fuel vapors from the vacuum source 14 passing into conduit 132 may also pass through the open check valve 164 and branch conduit 162 into the interior of canister 154 through port 160. Therefore the larger capacity of the canister 154, which has been used in production on automotive vehicles for some years, can adsorb the additional fuel vapors even if the vapor trap filter 34 tends to become saturated. This is important because it provides an outlet for intake manifold vapor gases on a non-running hot engine without increasing the size of vapor trap filter 34.

When the engine 10 is started and the vacuum source 14 begins producing vacuum, the vacuum so produced is quickly imposed within conduit 132 and fuel trap filter 34. Assuming the vacuum is greater than the stored vacuum in the power brake unit 18, the check valve 26 will be opened and some evacuation of the power brake unit 18 will occur. The air so evacuated is moved through the vapor trap filter 34 and desorbs the fuel vapors trapped therein so that they are conducted to the vacuum source 14 and delivered to the engine intake. Normally open check valve 164 will be closed when vacuum is initially imposed in conduit 132 by action of the lower absolute pressure in conduit 132 in relation to the pressure in conduit 162, so that the canister 154 is not immediately purged through branch conduit 162. When the vacuum source has built up sufficient vacuum in chamber 172 of the control valve 166 through conduit 142, port 194 and restrictive orifice 196, which will have been after a short delay under control of the purge control vacuum conduit 142 and the restrictive orifice 196, sufficient differential pressure will be exerted across diaphragm 170 to overcome the force of valve spring 184 and open valve 176 relative to valve seat 178. Since vacuum from vacuum source 14 is already imposed in chamber 174, which has a smaller effective area acting on diaphragm 170 than does chamber 172, the opening of valve 176 will provide communication from the interior of canister 154 to the vacuum conduit 132 through port 182, passage 180, valve seat 178 past the then-open valve 176, and then through chamber 174, vacuum tube 186, port 188 and vacuum branch conduit 190. Because the canister 154 has a relatively large volume which is to be evacuated and the less restrictive flow from chamber 174 to conduit 132 as compared to the flow through restrictive orifice 196 and vacuum conduit 142, the vacuum in chamber 174 will decrease more quickly than the vacuum in chamber 172 so that the pressure differential acting across diaphragm 170 will increase in the valve opening direction, tending to hold the valve open. Check valve 164 will remain closed because of vacuum on the side of that check valve connected with conduit 132. Atmospheric air will be conducted into the canister 154 through vent 158 and will entrain the fuel vapors adsorbed therein, so that the desorbed fuel vapors are conducted to the engine 10 via control valve 166, vacuum branch conduit 190, vacuum conduit 132 and the vacuum source 14.

Whenever the vacuum from vacuum source 14 is insufficient to hold valve 176 open against the force of valve spring 184, the valve 176 closes and the canister purging operation terminates. At this time the canister will accept any migratory gases emanating from the engine intake manifold acting as the vacuum source 14 through check valve 164, which will then have returned to its normally open condition and conduit 162 and port 160.

When the vehicle brakes are applied, the power brake unit 18 has additional air flowing therethrough tending to further purge the vacuum trap filter 34 should less than all of the vapors adsorbed therein fail to be desorbed and conducted to the engine 10 upon initial start-up The embodiments of the invention in which an exclusive property or privilege is claimed are defined as follows:

1. In a power servomotor system having a servomotor operated by differential air pressures with one pressure being atmospheric air pressure and the other pressure being air at other than atmospheric air pressure, said other pressure being selectively generated by a pressure source which also entrains vapors therein which are capable of adversely affecting said servomotor if the vapors enter said servomotor and particularly if the vapors are condensed therein, said servomotor being connected to said pressure source by a main fluid conduit through which said other pressure is provided to said servomotor, the improvement comprising:

a first branch fluid conduit having a first T connection into said main fluid conduit at one end and the other end operatively connected to the higher absolute air pressure of said differential air pressures;

a vapor trap in said first branch fluid conduit fluidly between said first branch fluid conduit other end and the higher absolute air pressure operatively connected thereto;

a second branch fluid conduit having a normally open check valve therein and a second T connection into said main fluid conduit at one end and the other end operatively connected to said vapor trap and said first branch fluid conduit other end via said vapor trap, said check valve being operable in response to a vacuum pressure in said main fluid conduit to close to prevent fluid flow from said vapor trap to said second T connection, said vapor trap trapping and holding at least some of said entrained vapors in said other pressure air, transmitted via said second branch fluid conduit when said check valve is open, which may otherwise be transmitted to said servomotor from said pressure source during air flow said pressure source to said servomotor through said main fluid conduit, said vapor trap being purged of vapors so trapped therein upon air flow through said vapor trap and said first branch fluid conduit and said first T connection and a portion of said main conduit from said T connection to said pressure source;

and means in said first branch fluid conduit preventing said last mentioned air flow from continuing after a time delay in which the vapor trap purge action occurs, said time delay being controlled by means responsive to the other pressure when that other pressure is being generated by actuation of the pressure source.

2. In a power servomotor system having a servomotor operated by differential air pressures with one pressure being atmospheric air pressure and the other pressure being air at other than atmospheric air pressure, said other pressure being selectively generated by a pressure source which also entrains vapors therein which are capable of adversely affecting said servomotor if the vapors enter said servomotor and particularly if the vapors are condensed therein, said servomotor being connected to said pressure source by a main fluid conduit through which said other pressure is provided to said servomotor, the improvement comprising:

an in-line flow-through first vapor trap in said main fluid conduit;

first and second branch fluid conduits each having a T connection into said main fluid conduit at one end of each of said branch conduits between said pressure source and said first vapor trap and the other end of each of said branch conduits being operatively connected to the higher absolute air pressure of said differential air pressures;

a second vapor trap connected into and forming a part of each of said branch fluid conduits, said first and second vapor traps trapping and holding said entrained vapors in said other pressure air which may otherwise be transmitted to said servomotor from said pressure source during air flow from said pressure source to said servomotor through said main fluid conduit, said first branch fluid conduit having a normally open check valve therein between said main fluid conduit and said second vapor trap so as to permit some of said entrained vapors to be so trapped and held by said second vapor trap;

said first vapor trap being purged of vapors so trapped therein upon air flow through said main fluid conduit and said first fluid trap from said servomotor to said pressure source, said second vapor trap being purged to vapors so trapped therein upon air flow through said second branch fluid conduit from said second branch fluid conduit other end through said second vapor trap and said second branch fluid conduit T connection and a portion of said main conduit form said second branch fluid conduit T connection to said pressure source;

and means including a valve control vacuum conduit having a restrictive orifice therein and valve means controlled by vacuum pressure transmitted through said valve control vacuum conduit, said valve means being normally closed and arranged to be opened by a pressure-generated differential force acting thereon and generated by pressure respectively transmitted through said valve control vacuum conduit restrictive orifice and through said second vacuum branch conduit, said valve means upon a predetermined decrease in the differential force after said valve means is opened, closing and preventing said last mentioned air flow from continuing after a predetermined time during which predetermined time said valve means is open and the second vapor trap purge action occurs, said restrictive orifice acting to control said predetermined time by critical flow therethrough of control vacuum pressure from said vacuum source through said valve control vacuum conduit including said restrictive orifice, to said valve means.

3. In a vapor guard system including an engine having an intake providing a source of vacuum pressure and a source of fuel vapor, a main vacuum conduit having a normally closed first check valve therein, a vacuum power booster receiving vacuum pressure from said engine intake through said main vacuum conduit and said first check valve, and a first vapor trap for preventing fuel vapor from said engine intake from passing through said main vacuum conduit into said vacuum power booster;

the improvement comprising:

a first branch vacuum conduit connected at one end to atmospheric pressure and at the other end to said main vacuum conduit at a point fluidly intermediate said engine intake and said first vapor trap and having a normally open valve therein;

a second vapor trap in said first branch vacuum conduit between said normally open valve and said conduit other end, said second vapor trap also preventing fuel vapor from said engine intake from passing through said main vacuum conduit into said vacuum power booster by trapping such fuel vapor in said main vacuum conduit which enters said second vapor trap through said first branch vacuum conduit;

and means, acting in response to the starting and running of the engine to generate vacuum pressure in the engine intake and said main vacuum conduit, to close said normally open valve after a period of engine running after being stored, the extent of said period being determined by the time required to generate sufficient pressure differential across said normally open valve to close same, said means then permitting said normally closed first check valve to be opened to charge the vacuum power booster to a desired vacuum pressure level;

and a vapor trap purge second branch vacuum conduit operatively connecting said second vapor trap and said main vacuum conduit and having normally closed, selectively open, purge control valve means therein which when open permits full vapor purge flow through said second vapor trap and said second branch vacuum conduit to said main vacuum conduit;

said first and second vapor traps acting to trap by adsorption fuel vapors from said intake passing through said main vacuum conduit toward said booster while the engine is stopped, and to desorb the trapped fuel vapors so that trapped vapors return to the engine intake when the engine is started and running with said second vapor trap so desorbing fuel vapors only while said second branch vacuum conduit purge control valve means is open, said fuel vapors being prevented from passing through the normally closed first check valve into the booster should that check valve be not fully closed.

4. A method of preventing fuel vapors from reaching a vacuum powered servomotor from an engine intake which is a vacuum source commonly having fuel vapors therein particularly during the time shortly after the engine is stopped after being run, said method comprising the steps of:
 (1) while the engine is stopped maintaining an open connection between the engine intake and a fuel vapor adsorption device and intercepting fuel vapors passing from the engine intake toward the servomotor and adsorbing them within a bypass passage before they reach the servomotor, while concurrently blocking the connection to the servomotor and preventing entry of fuel vapors into the interior of the servomotor;
 (2) starting the engine and during an initial period of engine operation thereafter keeping the servomotor blocked while previously adsorbed fuel vapors are desorbed by air movement through the fuel vapor adsorption device and conducted to the engine intake for a time;
 (3) thereafter while the engine is still operating blocking the bypass passage and as needed then unblocking the connection to the servomotor to permit vacuum charging of the servomotor by air flow from the servomotor to the engine intake during engine operation;
 (4) and upon stopping the engine reblocking the connection to the servomotor against flow of fuel vapor into the servomotor from the engine intake and reopening the bypass passage to reestablish the open communication between the engine intake and fuel vapor adsorption device;
 (5) and repeating step (1).

5. A method of preventing fuel vapors from reaching a vacuum powered servomotor from an engine intake which is a vacuum source commonly having fuel vapors therein particularly during the time shortly after the engine is stopped after being run, said method comprising the steps of:
 (1) while the engine is stopped maintaining an open connection between the engine intake and first and second fuel vapor adsorption devices and intercepting fuel vapors passing from the engine intake toward the servomotor and adsorbing them within said devices before they reach the servomotor, while concurrently blocking the connection to the servomotor and preventing entry of fuel vapors into the interior of the servomotor;
 (2) staring the engine and during an initial period of engine operation thereafter keeping the servomotor blocked while previously adsorbed fuel vapors in the first device are desorbed by air movement through the first fuel vapor adsorption device and conducted to the engine intake for a time;
 (3) while the engine is still operating blocking the connection between the engine intake and the first device through which fuel vapors had passed as recited in step (1) above so as to be absorbed within the first device, and as needed then unblocking the connection
 (3) while the engine is still operating blocking the connection between the engine intake and the first device through which fuel vapors had passed as recited in step (1) above so as to be absorbed within the first device, and as needed then unblocking the connection to the servomotor to permit vacuum charging of the servomotor by air flow from the servomotor to the engine intake during engine operation and desorbing fuel vapors previously absorbed in the second device;
 (4) and upon stopping the engine reblocking the connection to the servomotor against flow of fuel vapor into the servomotor from the engine intake and reopening the connection which was blocked in step (3) above to reestablish the open communication between the engine intake and first fuel vapor adsorption device;
 (5) and repeating step (1).

* * * * *